(12) United States Patent
Wang

(10) Patent No.: US 7,543,858 B1
(45) Date of Patent: Jun. 9, 2009

(54) WATER PIPE CONNECTOR

(76) Inventor: Hudson Wang, 19F., No. 136, Sec. 2, Pa-Te Rd., Feng-Shan City, Kaohsiung Hsien (TW)

( * ) Notice: Subject to any disclaimer, the term of this patent is extended or adjusted under 35 U.S.C. 154(b) by 0 days.

(21) Appl. No.: 12/032,902

(22) Filed: Feb. 18, 2008

(51) Int. Cl.
*F16L 37/18* (2006.01)
(52) U.S. Cl. .................................. 285/314; 285/322
(58) Field of Classification Search ............. 285/314, 285/309, 313, 322, 358, 359, 394, 395, 323, 285/324, 396
See application file for complete search history.

(56) References Cited

U.S. PATENT DOCUMENTS

| | | | | |
|---|---|---|---|---|
| 3,083,042 | A * | 3/1963 | Collar | 285/314 |
| 4,632,437 | A * | 12/1986 | Robson et al. | 285/314 |
| 5,697,652 | A * | 12/1997 | Nishikawa | 285/314 |
| 5,779,284 | A * | 7/1998 | Guest | 285/322 |
| 6,056,326 | A * | 5/2000 | Guest | 285/314 |
| 6,179,346 | B1 * | 1/2001 | Robson | 285/314 |
| 7,425,022 | B2 * | 9/2008 | Guest | 285/322 |

* cited by examiner

*Primary Examiner*—David E Bochna
(74) *Attorney, Agent, or Firm*—Brooks Kushman P.C.

(57) ABSTRACT

A water pipe connector includes a pipe coupling portion surrounding an axis and adapted to be sleeved on one end of a water pipe, a clamping component having resilient arms that extend between the pipe coupling portion and the water pipe and that have engaging members projecting through radial holes in the pipe coupling portion, and a locking collar. The locking collar is sleeved on the pipe coupling portion, has an internal collar surface formed with a plurality of first grooves, and is rotatable about the axis between an unlocking position, where the engaging members are received respectively in the first grooves, and a locking position, where the internal collar surface abuts against the engaging members and urges the resilient arms to abut tightly against the water pipe so as to arrest removal of the water pipe from the pipe coupling portion.

6 Claims, 10 Drawing Sheets

WATER PIPE CONNECTOR

BACKGROUND OF THE INVENTION

1. Field of the Invention

The invention relates to a connector, more particularly to a water pipe connector.

2. Description of the Related Art

A conventional water pipe connector has a plurality of metal pipe coupling ends, each of which is sleeved on and is deformed to clamp tightly one end of a corresponding water pipe, thereby connecting a plurality of the water pipes together. However, it is troublesome to deform the metal pipe coupling ends, and it is time-consuming and inconvenient to apply this conventional water pipe connector for connection to a large number of water pipes. Additionally, the thermal expansion and contraction of the metal pipe coupling ends may cause water leakage between the pipe coupling ends and the water pipe.

As shown in FIGS. 1 and 2, another conventional water pipe connector is made of plastic and comprises a hollow main body 1 having opposite pipe coupling portions 11, and a pair of clamping components 2. Each of the clamping components 2 has a rim portion 21, and a plurality of angularly spaced apart resilient arms 22 extending from the rim portion 21 into a respective one of the pipe coupling portions 11 so as to engage the clamping component 2 to the respective one of the pipe coupling portions 11. Each of the resilient arms 22 is provided with a metal positioning member 221 projecting radially and inwardly. For each assembly of one pipe coupling portion 11 and the corresponding clamping component 2, when an end segment of a water pipe 100 is extended into the clamping component 2, the resilient arms 22 are loosely disposed around the end segment of the water pipe 100. If the water pipe 100 is pulled away from the pipe coupling portion 11, the clamping component 2 is driven to move along with the water pipe 100 relative to the pipe coupling portion 11 due to friction between the resilient arms 22 and the pipe coupling portion 11. During the movement of the clamping component 2, the resilient arms 22 are urged by an inner wall surface of the pipe coupling portion 11 in radial directions, such that the positioning members 221 of the resilient arms 22 abut tightly against the end segment of the water pipe 100 so as to hinder removal of the water pipe 100 from the pipe coupling portion 11. To remove the water pipe 100 from the pipe coupling portion 11, the clamping component 2 has to be held still relative to the pipe coupling portion 11 while the end segment of the water pipe 100 is pulled out from the pipe coupling portion 11.

This conventional water pipe connector further has a pair of seal rings 3 and a pair of annular spacers 4. Each of the seal rings 3 is an O-ring, and is disposed in a respective one of the pipe coupling portions 11. Each of the annular spacers 4 is disposed in a respective one of the pipe coupling portions 11 between a corresponding one of the seal rings 3 and a corresponding one of the clamping components 2. For each assembly of one pipe coupling portion 11 and the corresponding clamping component 2, when the end segment of the water pipe 100 is extended into the clamping component 2, the resilient arms 22 will push the corresponding spacer 4 to abut against the corresponding seal ring 3, thereby preventing water leakage.

However, the radial thickness of the rim portion 21 of each of the clamping components 2 is too small for a user to hold during the removal of the water pipe 100 from the respective one of the pipe coupling portions 11. Moreover, the removal process of the water pipe 100 from the respective one of the pipe coupling portions 11 is relatively difficult for a beginner without any instructions.

SUMMARY OF THE INVENTION

Therefore, the object of the present invention is to provide a water pipe connector that facilities connection and removal of a water pipe.

Accordingly, a water pipe connector of the present invention is adapted for connection to a water pipe and comprises a hollow main body, a clamping component, and a locking collar. The main body has a pipe coupling portion that is adapted to be sleeved on one end segment of the water pipe and that has an inner wall surface surrounding an axis, an outer wall surface opposite to the inner wall surface, and a plurality of radial holes formed through the inner and outer wall surfaces and angularly spaced apart from each other relative to the axis. The clamping component has a rim portion that surrounds the axis, and a plurality of resilient arms that extend from the rim portion parallel to the axis and that are to be disposed between the inner wall surface of the pipe coupling portion of the main body and the end segment of the water pipe. Each of the resilient arms has an engaging member projecting through a respective one of the radial holes in the pipe coupling portion of the main body. The locking collar is sleeved rotatably on the pipe coupling portion of the main body, has an internal collar surface formed with a plurality of first grooves that are angularly spaced apart from each other relative to the axis, and is rotatable about the axis between an unlocking position, where the engaging members are received respectively in the first grooves in the internal collar surface such that the resilient arms are loosely disposed around the end segment of the water pipe and permit removal of the end segment of the water pipe from the pipe coupling portion of the main body, and a locking position, where the internal collar surface abuts against the engaging members and urges the resilient arms in radial inward directions relative to the axis, thereby enabling the resilient arms to abut tightly against the end segment of the water pipe in the pipe coupling portion so as to arrest removal of the end segment of the water pipe from the pipe coupling portion of the main body.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
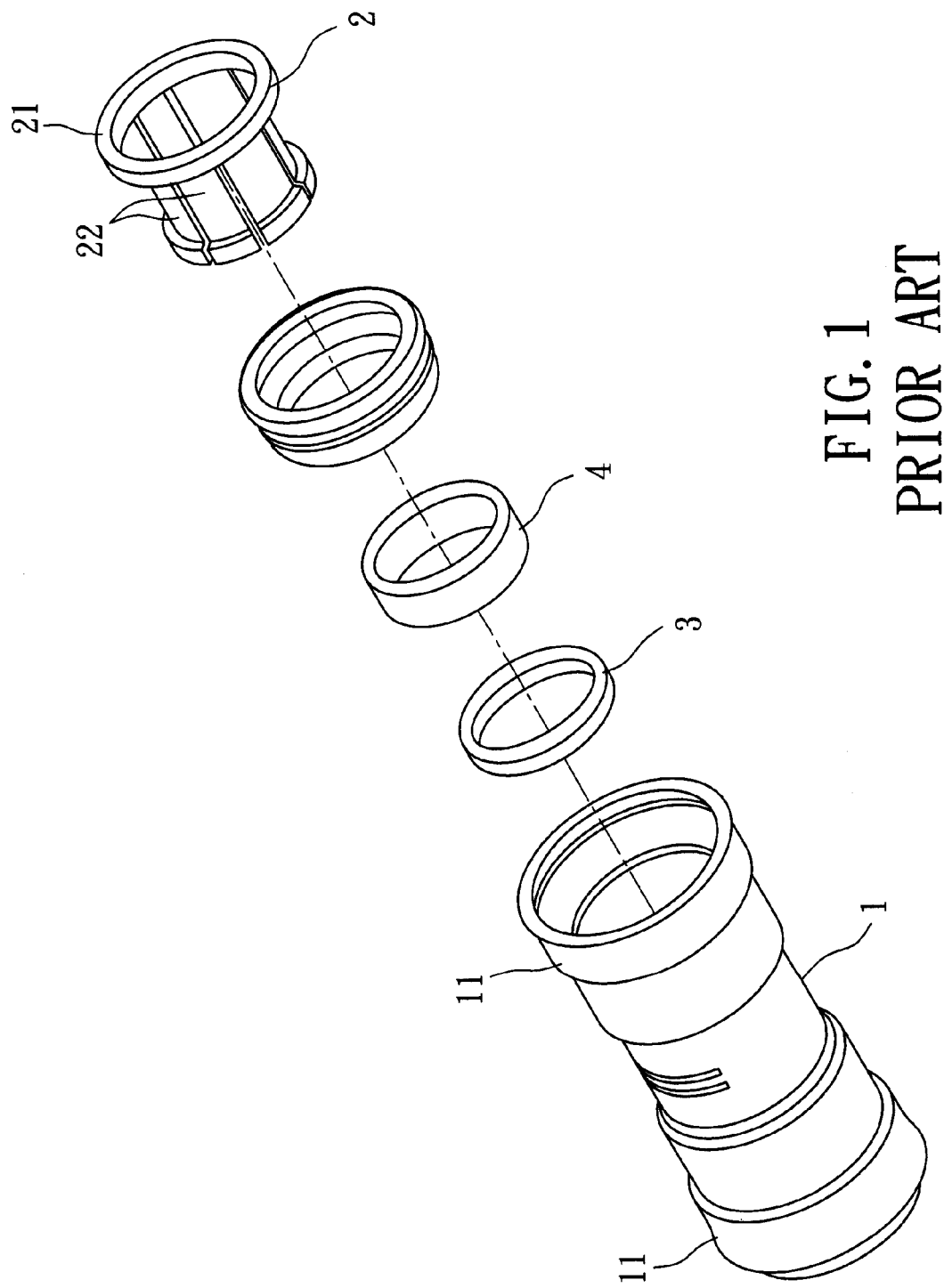
FIG. 1 is a fragmentary exploded perspective view of a conventional water pipe connector.
Figure 2:
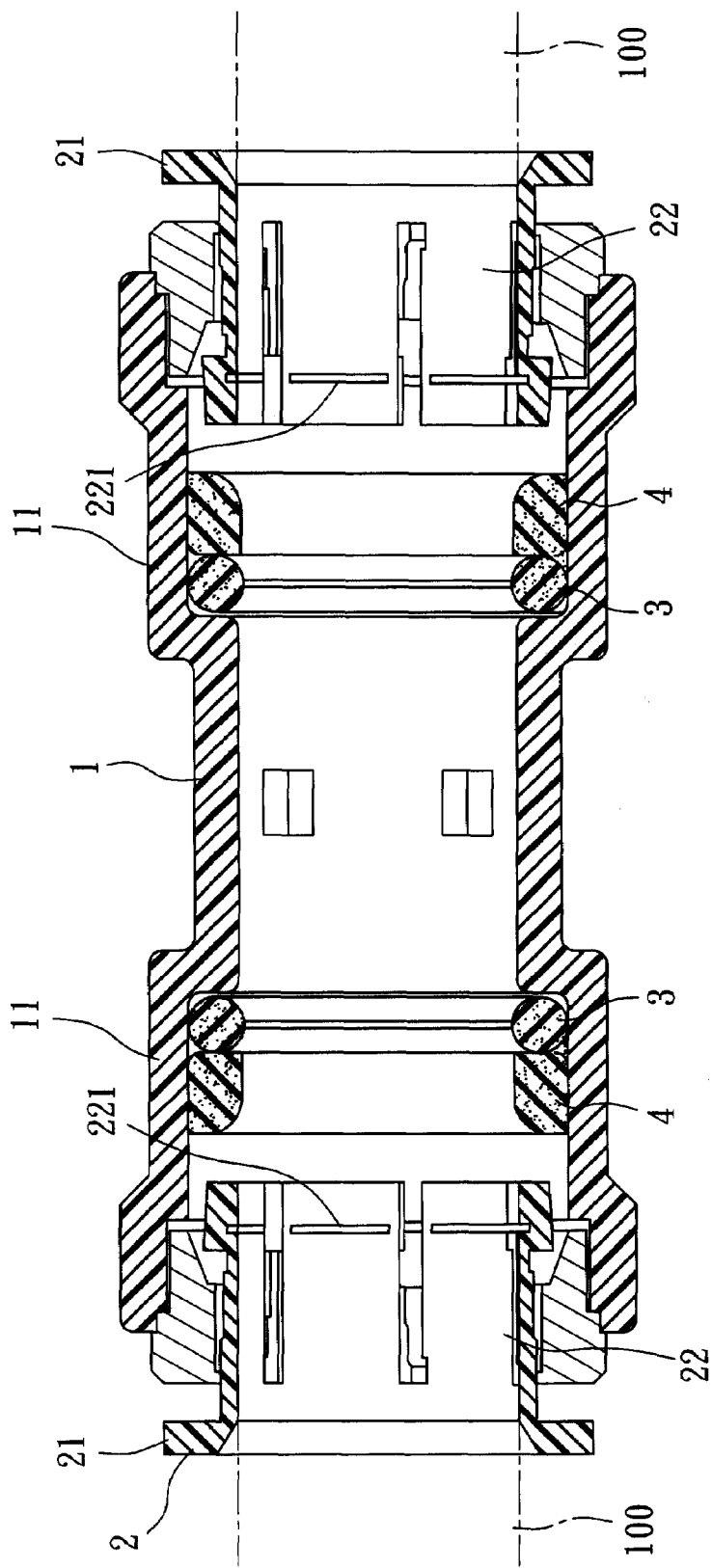
FIG. 2 is a sectional view of the conventional water pipe connector.

Before the present invention is described in greater detail, it should be noted that like elements are denoted by the same reference numerals throughout the disclosure.

Figure 5:
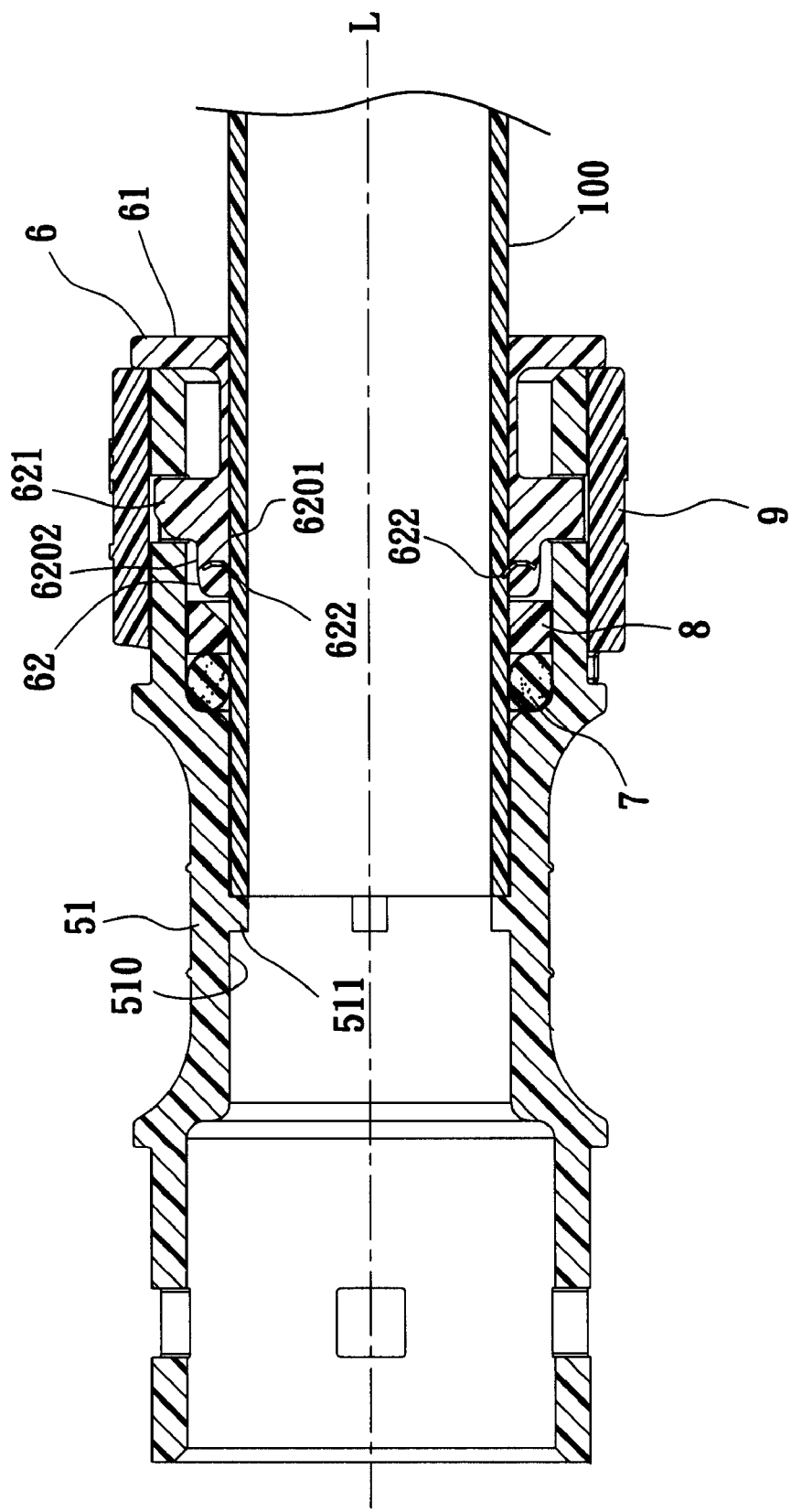
FIG. 5 is a fragmentary sectional view of the first preferred embodiment.
Figure 6:
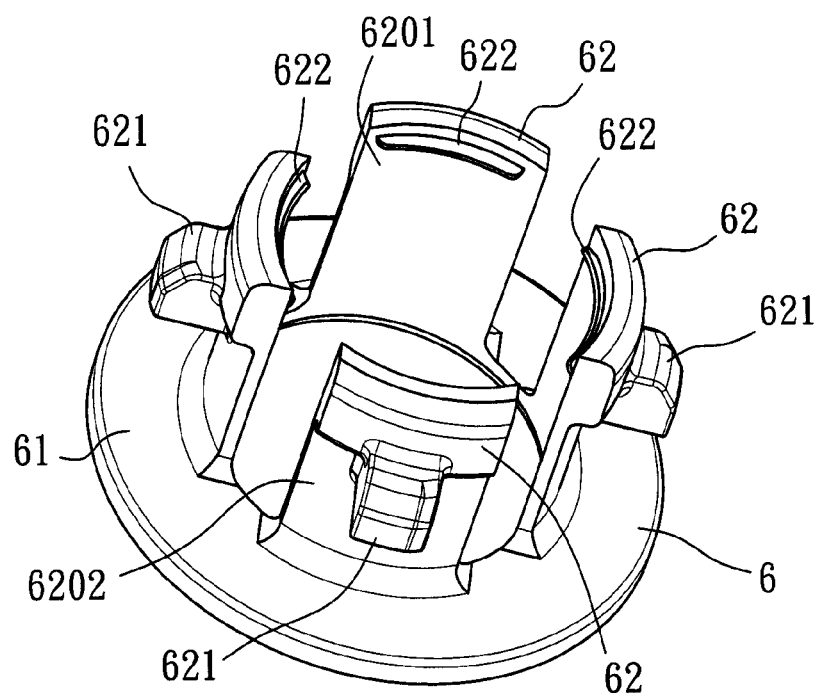
FIG. 6 is a perspective view of a clamping component of the first preferred embodiment.

As shown in FIGS. 3 to 6, the first preferred embodiment of a water pipe connector according to the present invention is adapted for connection to a pair of water pipes 100 (only one water pipe 100 is shown in FIG. 5), and comprises a hollow main body 5 made of rigid plastic, a pair of clamping components 6, a pair of sealing components 7, a pair of spacers 8, and a pair of locking collars 9.

The main body 5 has an intermediate portion 51 surrounding an axis (L), and a pair of pipe coupling portions 52 extending respectively from two ends of the intermediate portion 51 in opposite directions away from the intermediate portion 51 along the axis (L). The intermediate portion 51 has an internal wall surface 510 formed with a plurality of protrusions 511 that are angularly spaced apart from each other relative to the axis (L). Each of the pipe coupling portions 52 has an inner wall surface 523, an outer wall surface 524 opposite to the inner wall surface 523 and formed with a pair of stop blocks 522 (only one is visible in FIG. 4) that are angularly spaced apart from each other relative to the axis (L), and four radial holes 521 formed through the inner and outer wall surfaces 523, 524 and angularly spaced apart from each other relative to the axis (L).

In this embodiment, each of the clamping components 6 has a rim portion 61 that surrounds the axis (L), and four resilient arms 62 that extend from the rim portion 61 parallel to the axis (L) into a respective one of the pipe coupling portions 52 of the main body 5. Each of the resilient arms 62 has an outer arm surface 6202 formed with an engaging member 621 that projects through a respective one of the radial holes 521 in the respective one of the pipe coupling portions 52, and an inner arm surface 6201 opposite to the outer arm surface 6202 and embedded with a positioning member 622. In this embodiment, each of the positioning members 622 is made of SUS301 metal.

In this embodiment, each of the sealing components 7 is an O-ring surrounding the axis (L), and is disposed in the main body 5 adjacent to a respective one of the pipe coupling portions 52 so as to prevent water leakage. Each of the spacers 8 is disposed in a respective one of the pipe coupling portions 52 between the corresponding one of the sealing components 7 and the corresponding one of the clamping components 6, and has one side abutting against the corresponding one of the sealing components 7 for positioning the corresponding one of the sealing components 7 in the main body 5.

Figure 3:
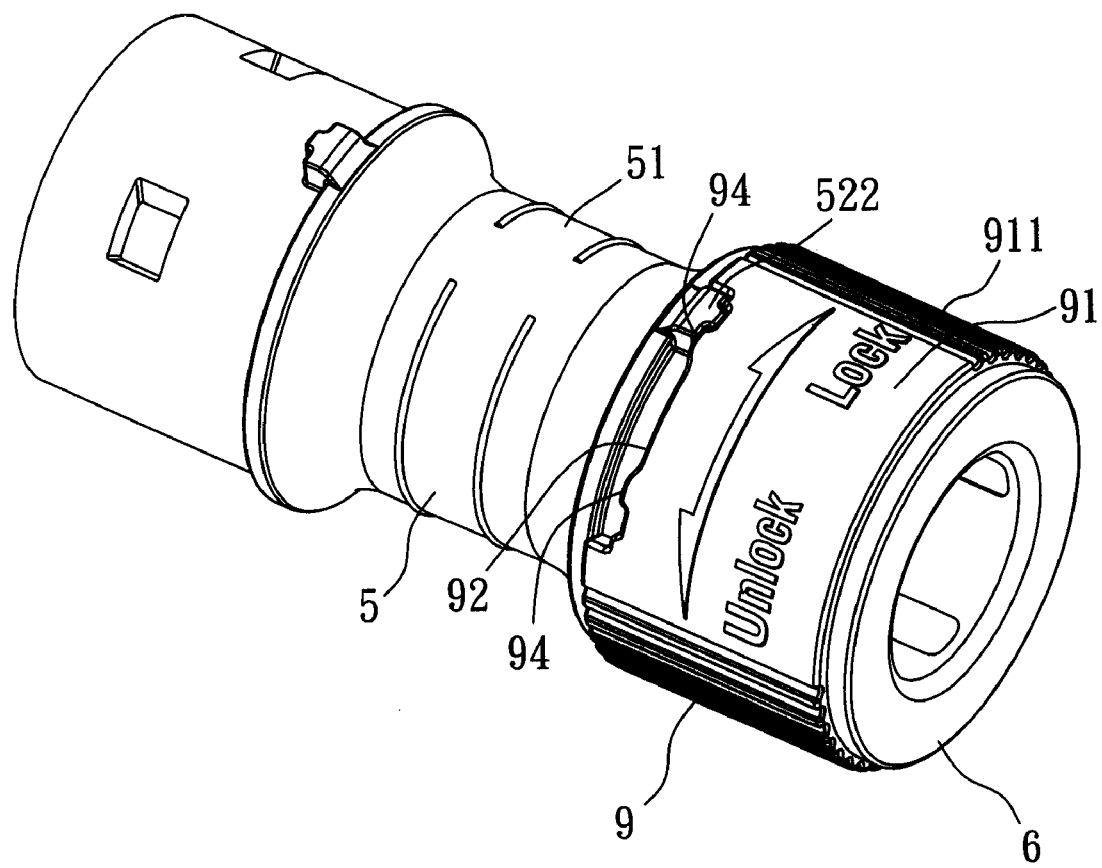
FIG. 3 is a fragmentary perspective view of a first preferred embodiment of a water pipe connector according to the invention.
Figure 4:
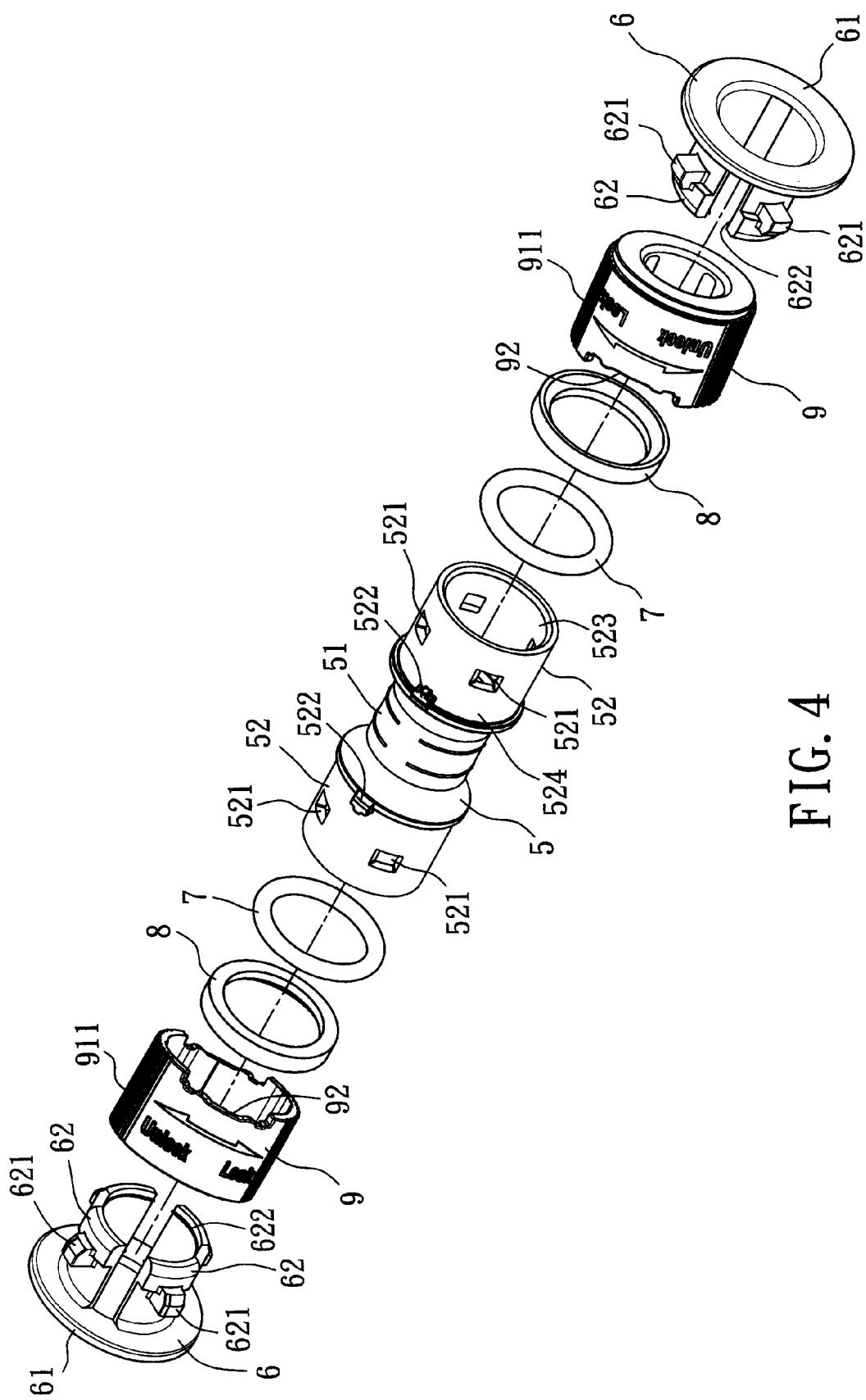
FIG. 4 is an exploded perspective view of the first preferred embodiment.
Figure 7:
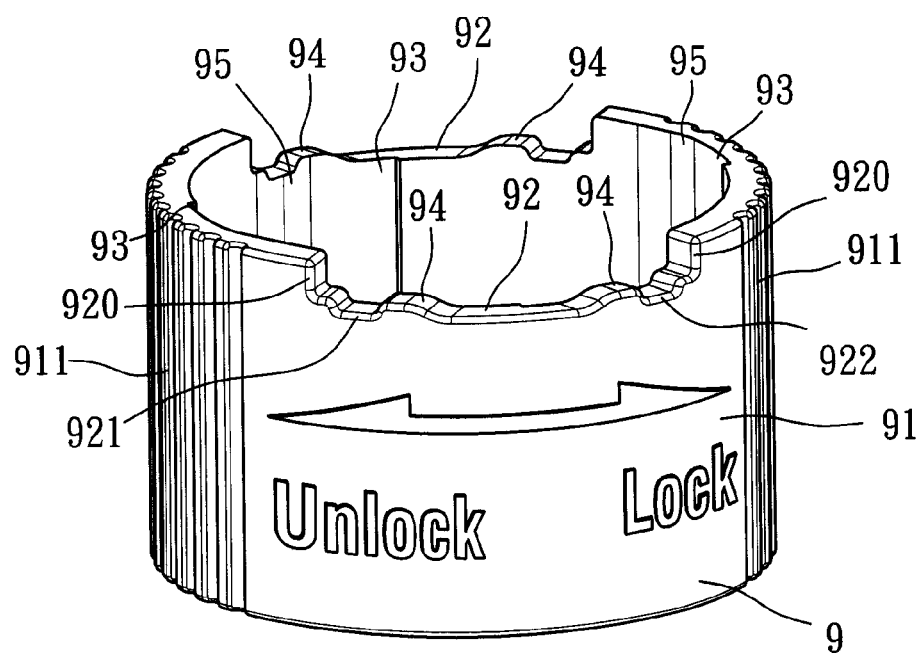
FIG. 7 is a perspective view of a locking collar of the first preferred embodiment.
Figure 8:
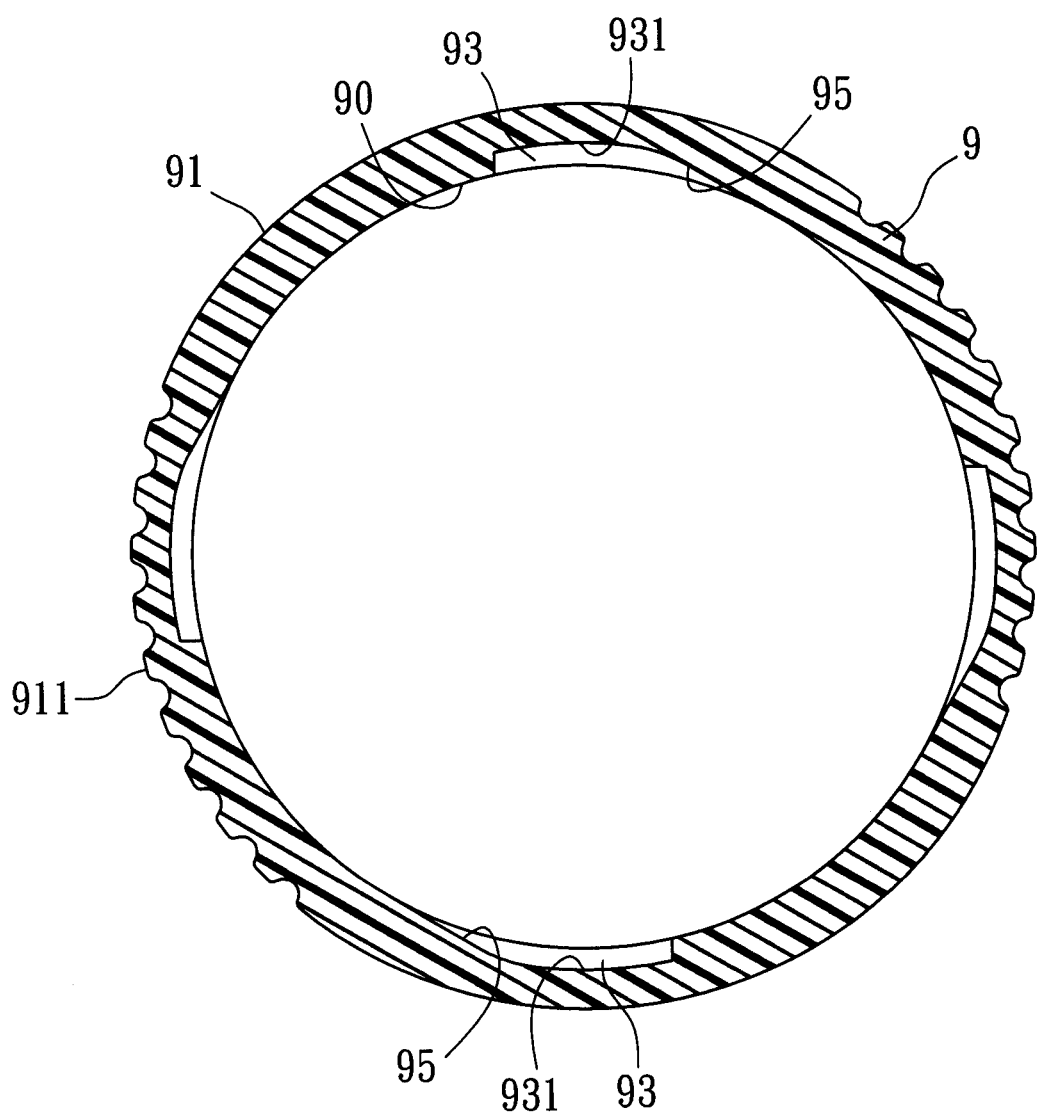
FIG. 8 is a sectional view of the locking collar.
Figure 9:
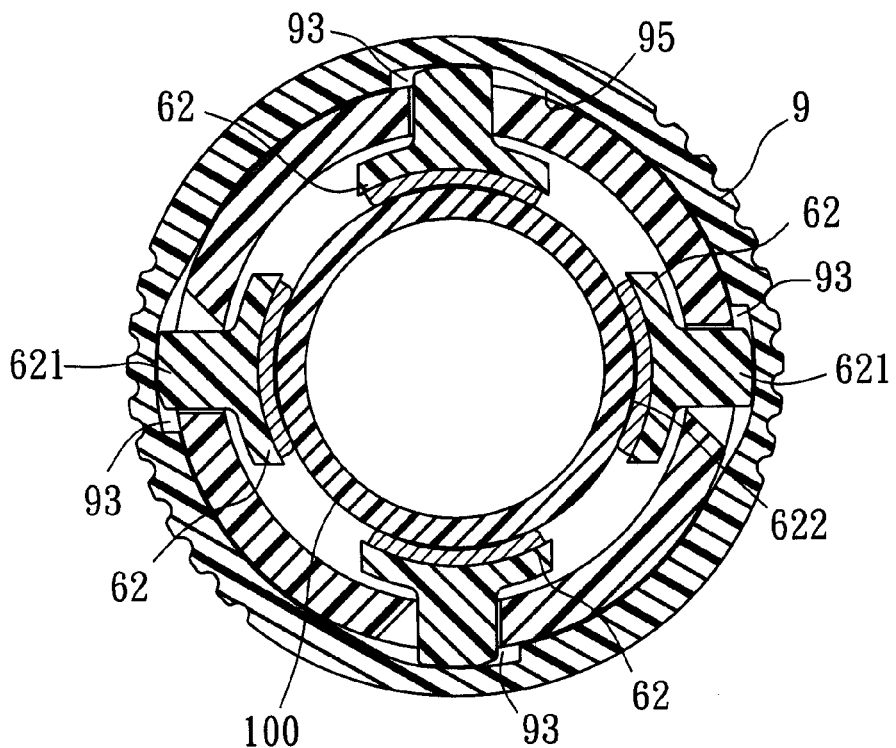
FIG. 9 is a sectional view of the first preferred embodiment, illustrating the locking collar at an unlocking position.
Figure 10:
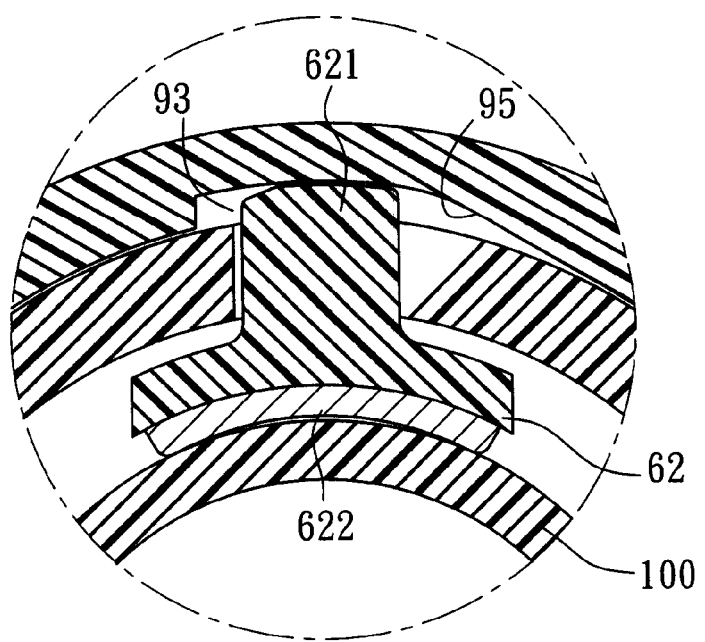
FIG. 10 is an enlarged fragmentary sectional view of the first preferred embodiment, illustrating the locking collar at an unlocking position.
Figure 11:
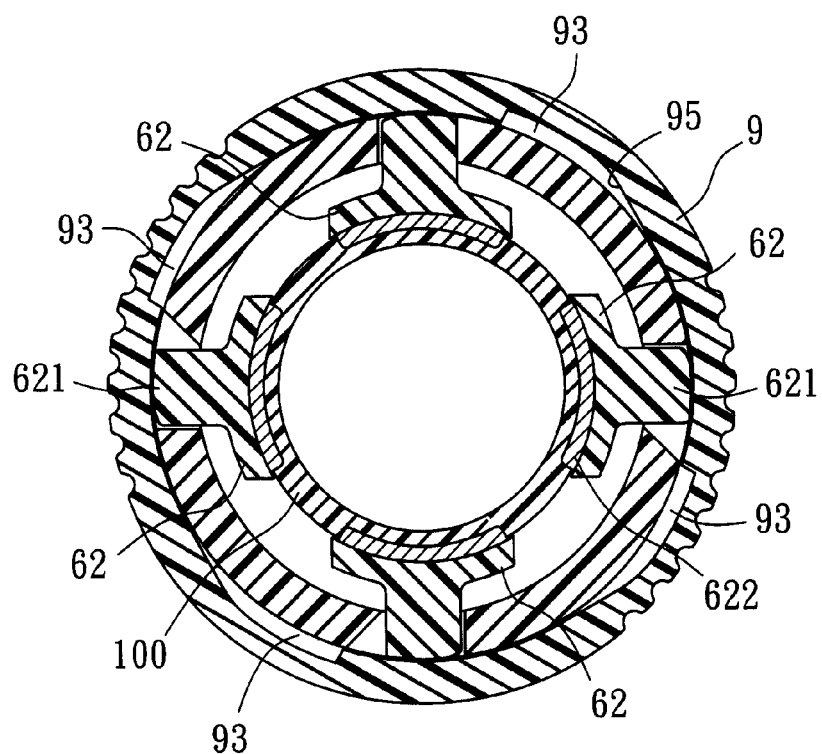
FIG. 11 is a view similar to FIG. 9, but illustrating the locking collar at a locking position.
Figure 12:
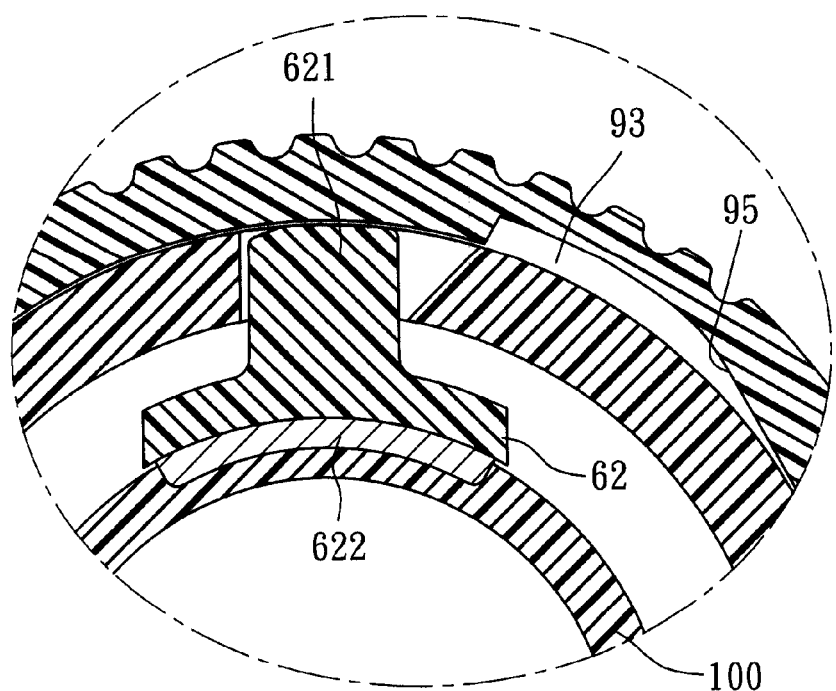
FIG. 12 is a view similar to FIG. 10, but illustrating the locking collar at a locking position.

Referring to FIGS. 3, 7 and 8, in this embodiment, the locking collars 9 are sleeved respectively and rotatably on the pipe coupling portions 52 of the main body 5. Each of the locking collars 9 has an internal collar surface 90 formed with four first grooves 93 that are angularly spaced apart from each other relative to the axis (L), and an external collar surface 91 formed with two textured portions 911 that are angularly spaced apart from each other relative to the axis (L). Each of the locking collars 9 further has one end formed with a pair of circumferentially extending second grooves 92 to receive the stop blocks 522 of the corresponding one of the pipe coupling portions 52, respectively. Each of the second grooves 92 has opposite circumferential ends 920 and is provided with two projections 94 respectively adjacent to the two circumferential ends 920. The projections 94 cooperate with the circumferential ends 920 to form angularly opposite first and second groove parts 921, 922. In this embodiment, each of the locking collars 9 is marked with text "Unlock" and "Lock" respectively adjacent to the first and second groove parts 921, 922. Each of the locking collars 9 is rotatable about the axis (L) between an unlocking position (see FIGS. 9 and 10) and a locking position (see FIGS. 11 and 12). Each of the first and second groove parts 921, 922 engages removably the corresponding stop block 522 of the corresponding one of the pipe coupling portions 52 so as to retain releasably the locking collar 9 at a desired one of the locking and unlocking positions. Each of the first grooves 93 has a groove bottom 931 (see FIG. 8) with an inclined segment 95, thereby configuring each of the first grooves 93 with a depth that gradually decreases in an angular direction.

For convenience of illustration, only one pipe coupling portion 52, one clamping component 6, and one locking collar 9 will be described in the following description. An end segment of the water pipe 100 can be inserted into the pipe coupling portion 52 when the locking collar 9 is disposed at the unlocking position, where the stop blocks 522 are retained in the first groove portions 921 of the second grooves 92. Once inserted, the end segment of the water pipe 100 is disposed within the resilient arms 62 of the clamping component 6, i.e., the resilient arms 62 are disposed between the inner wall surface 523 of the pipe coupling portion 52 and the end segment of the water pipe 100, and the engaging members 621 of the resilient arms 62 are received respectively in the first grooves 93 in the internal collar surface 90 such that the resilient arms 62 are loosely disposed around the end segment of the water pipe 100. Afterward, the locking collar 9 is rotated about the axis (L) from the unlocking position to the locking position, where the stop blocks 522 are retained in the second groove portions 922 of the second grooves 92. At this time, the internal collar surface 90 abuts against the engaging members 621 and urges the resilient arms 62 in radial inward directions relative to the axis (L), thereby enabling the resilient arms 62 to abut tightly against the end segment of the water pipe 100 in the pipe coupling portion 52 with the positioning members 622 piercing into the end segment of the water pipe 100 so as to arrest removal of the end segment of the water pipe 100 from the pipe coupling portion 52. Contrarily, the locking collar 9 can be rotated from the locking position to the unlocking position, such that the engaging members 621 are moved respectively into the first grooves 92 and the resilient arms 62 are released, thereby permitting removal of the end segment of the water pipe 100 from the pipe coupling portion 52.

When using the water pipe connector of this embodiment, the user can easily rotate the locking collar 9 due to the presence of the textured portions 911. Additionally, during rotation of the locking collar 9, the engaging members 621 are moved smoothly and respectively into and out of the first grooves 93, thereby facilitating the use of the water pipe connector of this embodiment.

Therefore, the water pipe 100 can be connected to and removed from the water pipe connector of this embodiment by simply rotating the locking collar 9 between the unlocking position and the locking position. Moreover, the text on the locking collar 9 facilitates the user to figure out how to use the water pipe connector of this embodiment.

Figure 13:
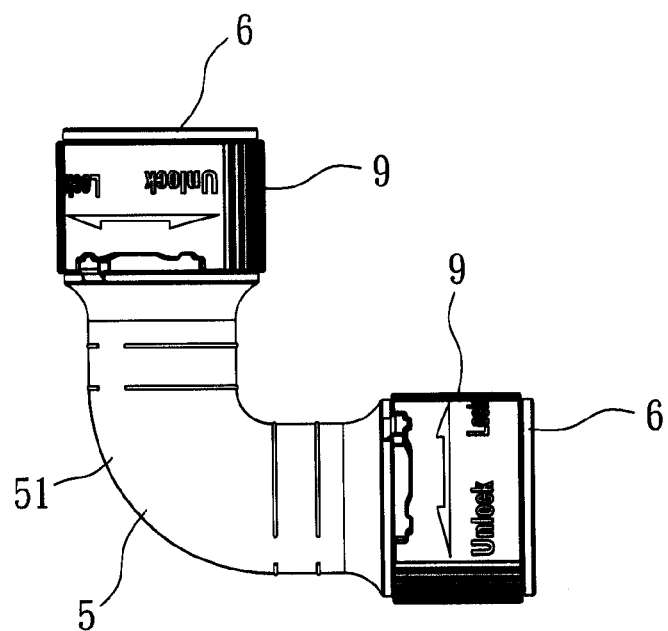
FIG. 13 is a side view of a second preferred embodiment of a water pipe connector according to the invention.

As shown in FIG. 13, the second preferred embodiment of the water pipe connector according to the present invention has a structure similar to that of the first preferred embodiment. The main difference between this embodiment and the previous embodiment resides in that the main body 5 is formed in an L-shape. The second preferred embodiment has the same advantages as those of the first preferred embodiment.

Figure 14:
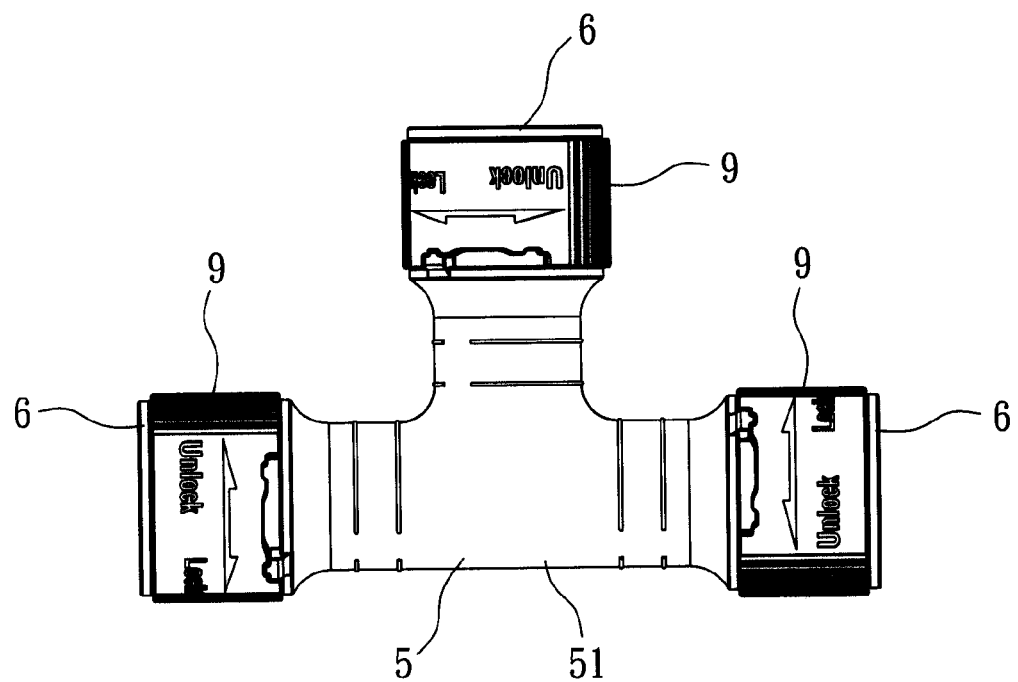
FIG. 14 is a side view of a third preferred embodiment of a water pipe connector according to the invention.

As shown in FIG. 14, the third preferred embodiment of the water pipe connector according to the present invention has a structure similar to that of the first preferred embodiment. The main difference between this embodiment and the first preferred embodiment resides in that the main body 5 is formed in a T-shape. The third preferred embodiment has the same advantages as those of the first and second preferred embodiments.

It should be noted that, while this invention is exemplified with each of the clamping components 6 being formed with four resilient arms 62, the number of the resilient arms 62 may vary in other embodiments of this invention.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A water pipe connector adapted for connection to a water pipe, said water pipe connector comprising:

a hollow main body having a pipe coupling portion that is adapted to be sleeved on one end segment of the water pipe and that has an inner wall surface surrounding an axis, an outer wall surface opposite to said inner wall surface, and a plurality of radial holes formed through said inner and outer wall surfaces and angularly spaced apart from each other relative to the axis;

a clamping component having a rim portion that surrounds the axis, and a plurality of resilient arms that extend from said rim portion parallel to the axis and that are to be disposed between said inner wall surface of said pipe coupling portion of said main body and the end segment of the water pipe, each of said resilient arms having an engaging member projecting through a respective one of said radial holes in said pipe coupling portion of said main body; and a locking collar that is sleeved rotatably on said pipe coupling portion of said main body, that has an internal collar surface formed with a plurality of first grooves angularly spaced apart from each other relative to the axis, and that is rotatable about the axis between an unlocking position, where said engaging members are received respectively in said first grooves in said internal collar surface such that said resilient arms are loosely disposed around the end segment of the water pipe and permit removal of the end segment of the water pipe from said pipe coupling portion of said main body, and a locking position, where said internal collar surface abuts against said engaging members and urges said resilient arms in radial inward directions relative to the axis, thereby enabling said resilient arms to abut tightly against the end segment of the water pipe in said pipe coupling portion so as to arrest removal of the end segment of the water pipe from said pipe coupling portion of said main body.

2. The water pipe connector as claimed in claim 1, wherein each of said resilient arms of said clamping component has an outer arm surface formed with said engaging member, and an inner arm surface opposite to said outer arm surface and provided with a positioning member for abutting tightly against the end segment of the water pipe when said locking collar is disposed at the locking position.

3. The water pipe connector as claimed in claim 2, wherein said positioning member is embedded in said inner arm surface of said resilient arm.

4. The water pipe connector as claimed in claim 1, wherein said outer wall surface of said pipe coupling portion of said main body is formed with a stop block, and said locking collar is formed with a circumferentially extending second groove to receive said stop block.

5. The water pipe connector as claimed in claim 4, wherein said second groove has angularly opposite groove parts, each of which engages removably said stop block so as to retain releasably said locking collar at a desired one of the locking and unlocking positions.

6. The water pipe connector as claimed in claim 1, wherein each of said first grooves has a groove bottom with an inclined segment, thereby configuring each of said first grooves with a depth that gradually decreases in an angular direction.

\* \* \* \* \*